May 24, 1927.

P. WEEKS

GROUSER

Filed June 21, 1926

1,629,768

Inventor
Paul Weeks

By W. N. Roach.

Attorney

Patented May 24, 1927.

1,629,768

UNITED STATES PATENT OFFICE.

PAUL WEEKS, OF DETROIT, MICHIGAN, ASSIGNOR TO THE SECRETARY OF WAR OF THE UNITED STATES, TRUSTEE.

GROUSER.

Application filed June 21, 1926. Serial No. 117,651.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The subject of this invention is a grouser.

In vehicles of the track laying type it is customary to provide grousers for the track shoes which may be removed or attached according to the nature of the road to be traveled.

In those types of track shoes which are equipped with rubber treads it is not practical or desirable to apply a grouser by means of bolts or any securing means which would penetrate the rubber and while a consideration of this nature has led to the present design the structure is such as to be used advantageously with other types of shoes.

The principal object then of the present invention is to provide a grouser which may be quickly applied to a track shoe without requiring any special provision on the shoe for securing the same.

To these and other ends, my invention consists in the construction, arrangement, and combination of elements, described hereinafter and pointed out in the claims forming a part of this specification.

A practical embodiment of the invention is illustrated in the accompanying drawings, wherein.

Figure 1:
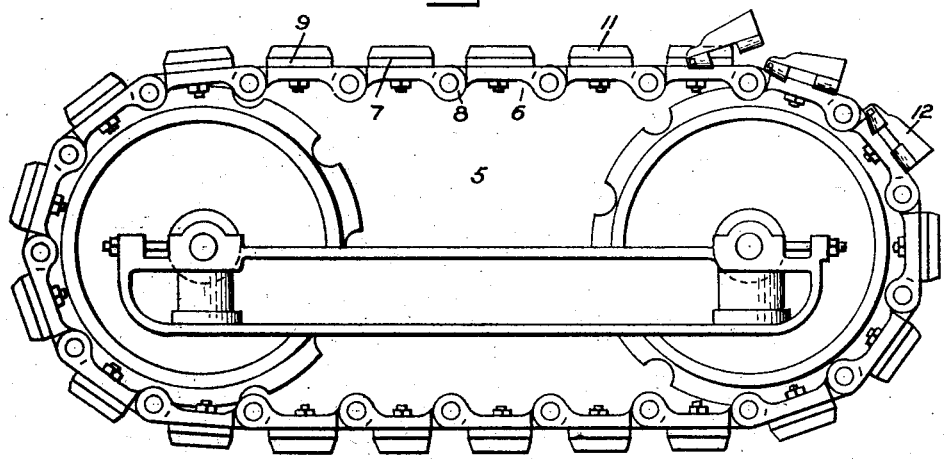
Fig. 1 is a side elevation of a vehicle showing my improved grouser applied to several of the track shoes.
Figure 3:
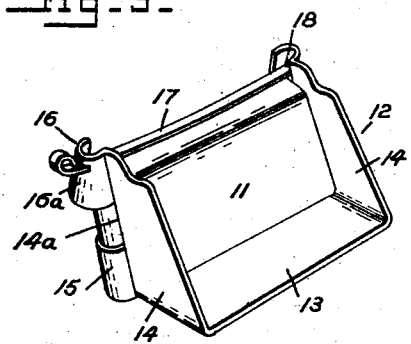
Fig. 3 is a similar view showing the grouser in place.
Figure 2:
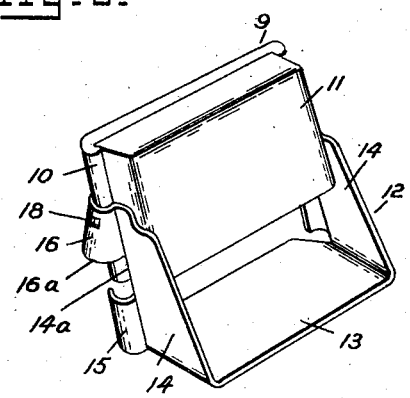
Fig. 2 is a perspective view showing one step in the assembling operation.
Figure 4:
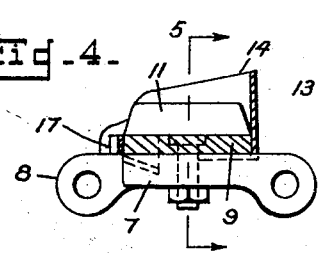
Fig. 4 is a sectional view on the line 4—4 of Fig. 5.
Figure 5:
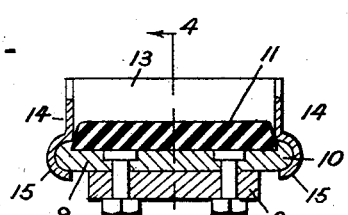
Fig. 5 is a sectional view on the line 5—5 of Fig. 4.
Figure 6:
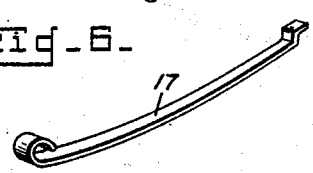
Fig. 6 is a detail view of the locking key.

Referring to the drawings by numerals of reference:

There is shown a vehicle 5 equipped with an endless self-laying sectional track 6, each section comprising a shoe 7 having link members 8—8 whereby the shoes may be connected through the usual link pins. In the present instance the shoe consists of a tread plate 9 having upturned or beaded sides 10 between which is a rubber pad 11, or the like, forming the tread for travel over improved roads.

The grouser 12 which is to be applied to the shoe for cross country travel is in the form of a three-sided plate, the end portion 13 constituting the pressure plate and disposed when in place transversely of and perpendicular to the track, while the two substantially triangular side portions 14—14, which are at right angles thereto, are formed each with a pair of spaced ears 15 and 16 conforming generally to the shape of the heads on the tread plate so that when the grouser has been mounted in position it will be securely held against lateral displacement. In order that the grouser may be easily slid onto the tread plate without interference of the pressure plate with the succeeding shoe, the foremost ears 16 are enlarged at their rear ends as at 16$^a$ which permits manipulation of the grouser during the assembling operation. This construction is necessary inasmuch as the pressure plate when in place rests on the link members, the load being thus transmitted to the links and the reaction due to drawbar pull is taken against the tread plate. The length of the ears 15 is only limited by the distance separating the tread plates.

The means for retaining the grouser consists preferably of a spring key 17 which is inserted through apertures 18—18, one in each of the side portions 14 and the key when in place bears against the face of the tread plate 9 so that there will be no possibility of dislodging the rubber pad. The spring locking key does not resist the drawbar pull except when the tractor is moving in reverse.

While I have shown the grouser as being applied to a shoe whose position is at the bend of the track where the distance between the tread plates is usually greatest it may also be applied on the upper stretch of the track. In order to provide clearance for assembling succeeding grousers the side portions are cut away as at 14$^a$.

While in the foregoing there has been illustrated and described such combination and arrangement of elements as constitute the preferred embodiment of my invention,

I claim:

1. In a combination, a track for vehicles consisting of tread plates having link members, a grouser for each tread plate, said grouser formed of a transverse pressure plate adapted when in place to rest on the link members and longitudinally extending substantially triangular side plates each provided with an aperture, a pair of ears formed on said side plates for gripping the tread plate, the foremost of said ears enlarged at one end to facilitate application of the grouser, and a spring key insertable through the apertures of the side plates and engageable against the tread plate.

2. In combination, a track for vehicles consisting of tread plates having link members, a grouser for each tread plate, said grouser formed of a transverse pressure plate and longitudinally extending substantially triangular side plates each provided with an aperture, a pair of ears formed on said side plates for gripping the tread plate, the foremost of said ears enlarged at one end to facilitate application of the grouser, and a spring key insertable through the apertures of the side plates and engageable against the tread plate.

3. In combination, a track for vehicles consisting of tread plates having link members, a grouser for each tread plate, said grouser formed of a transverse pressure plate and longitudinally extending substantially triangular side plates each provided with an aperture, a pair of ears formed on said side plates for gripping the tread plate, and a spring key insertable through the apertures of the side plates and engageable against the tread plate.

4. In combination, a track for vehicles consisting of linked tread plates, a grouser for each tread plate, said grouser having a pressure plate disposed perpendicular of the tread plate and engageable against one of its transverse faces, side pieces on said pressure plate having each an aperture and formed with means for gripping the longitudinal sides of the tread plate, and a key insertable through the apertures of the side pieces and engageable against the other transverse face of the tread plate.

5. In combination, a track for vehicles consisting of linked tread plates, a grouser for each tread plate, said grouser having a pressure plate disposed perpendicular to the tread plate and engageable against one of its transverse faces, side pieces on said pressure plate having each an aperture, and a key insertable through the apertures of the side pieces and engageable against the other transverse face of the tread plate.

6. In combination, a grouser, an element to which the grouser is to be attached, said grouser formed with a transverse pressure plate and longitudinally extending side plates for gripping both sides of said element, and means engaging the side plates and abutting against the tread plate for retaining the grouser in place.

PAUL WEEKS.